Inventor
Kurt Räntsch
By Singer Stern & Carlberg
attys

July 3, 1962     K. RÄNTSCH     3,041,922
OPTICAL DEVICE FOR A CORRECT ADJUSTMENT AND READING OF
THE SLIDABLE DISPLACEMENT OF A CARRIAGE IN A MACHINE
Filed March 5, 1959     18 Sheets-Sheet 6
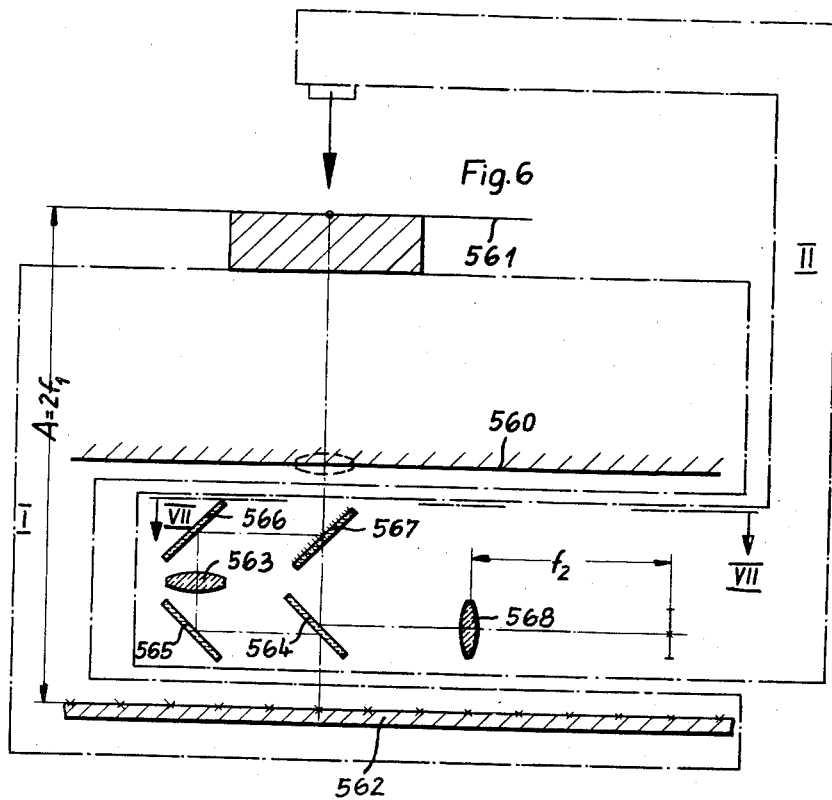
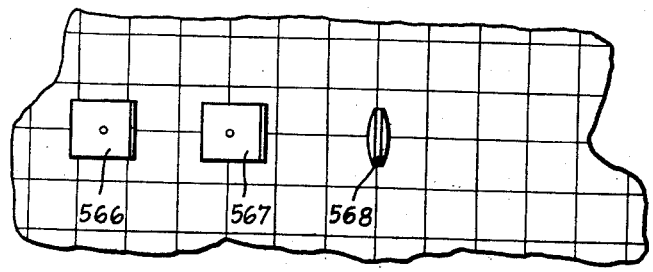
Fig.7
Inventor
Kurt Räntsch
By
Singer Stern & Carlberg
attys

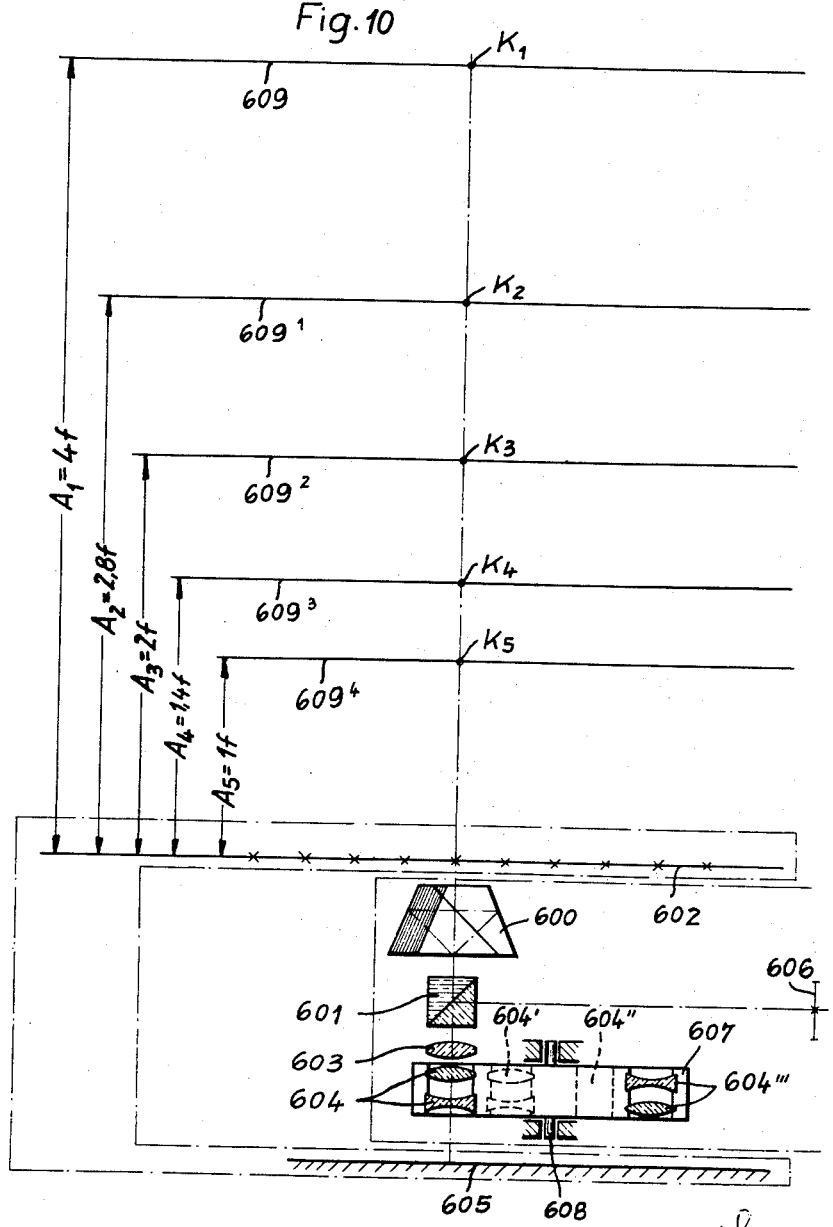

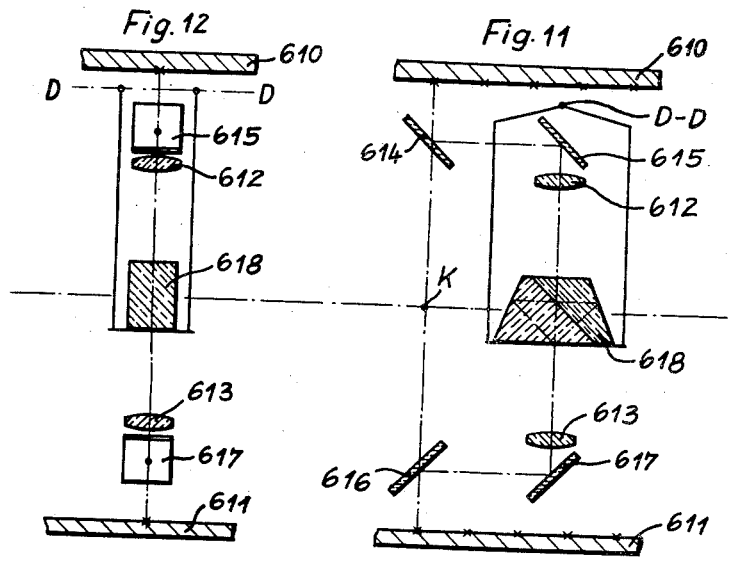
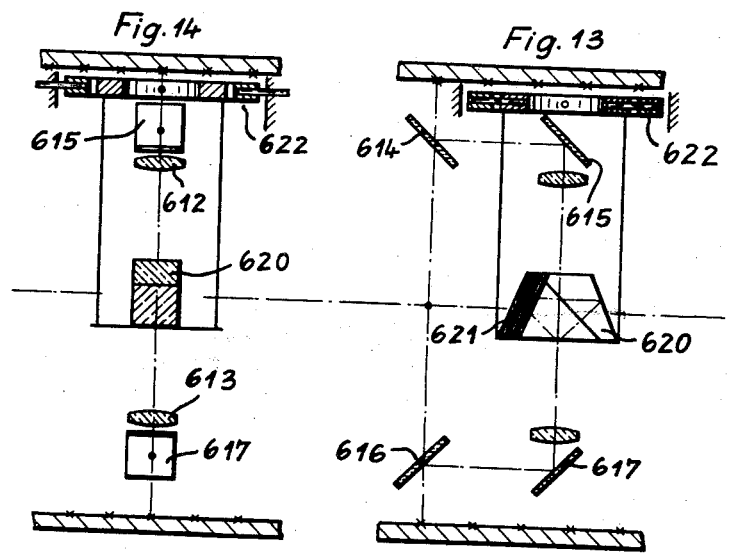

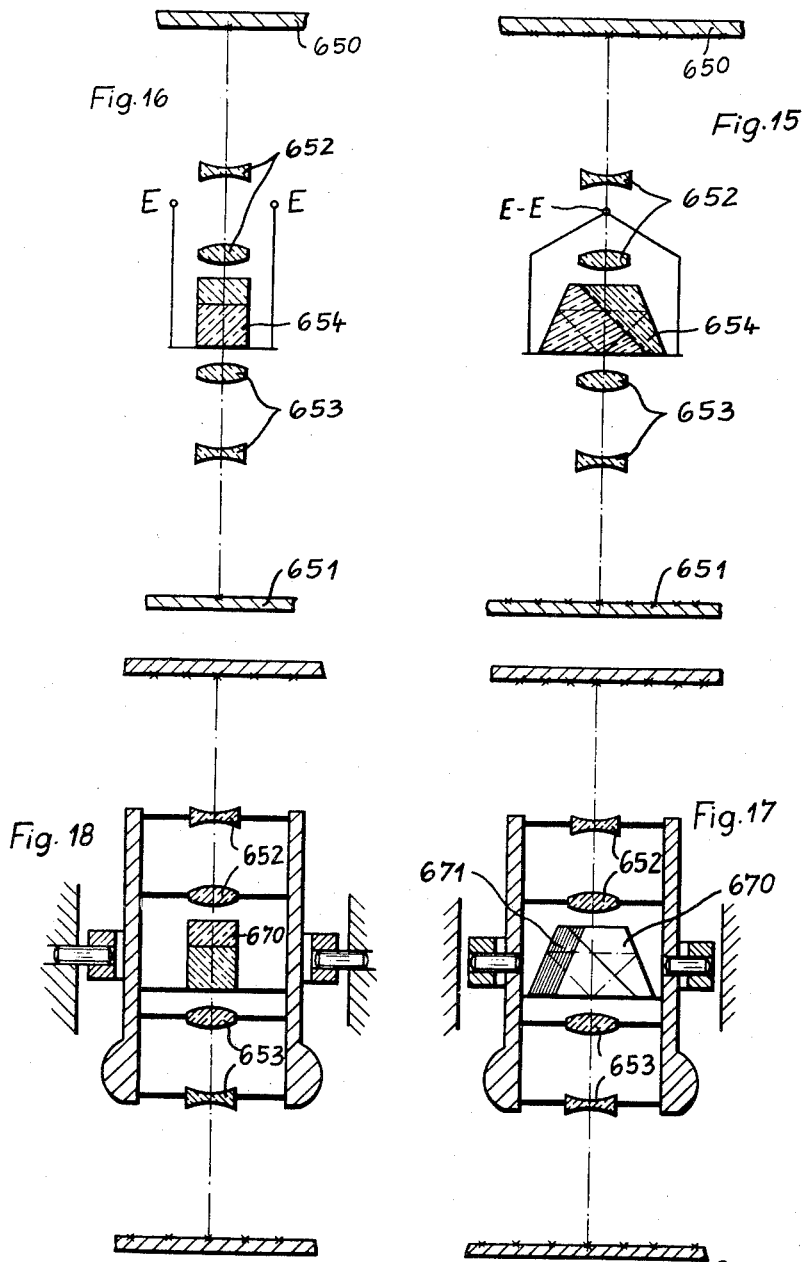

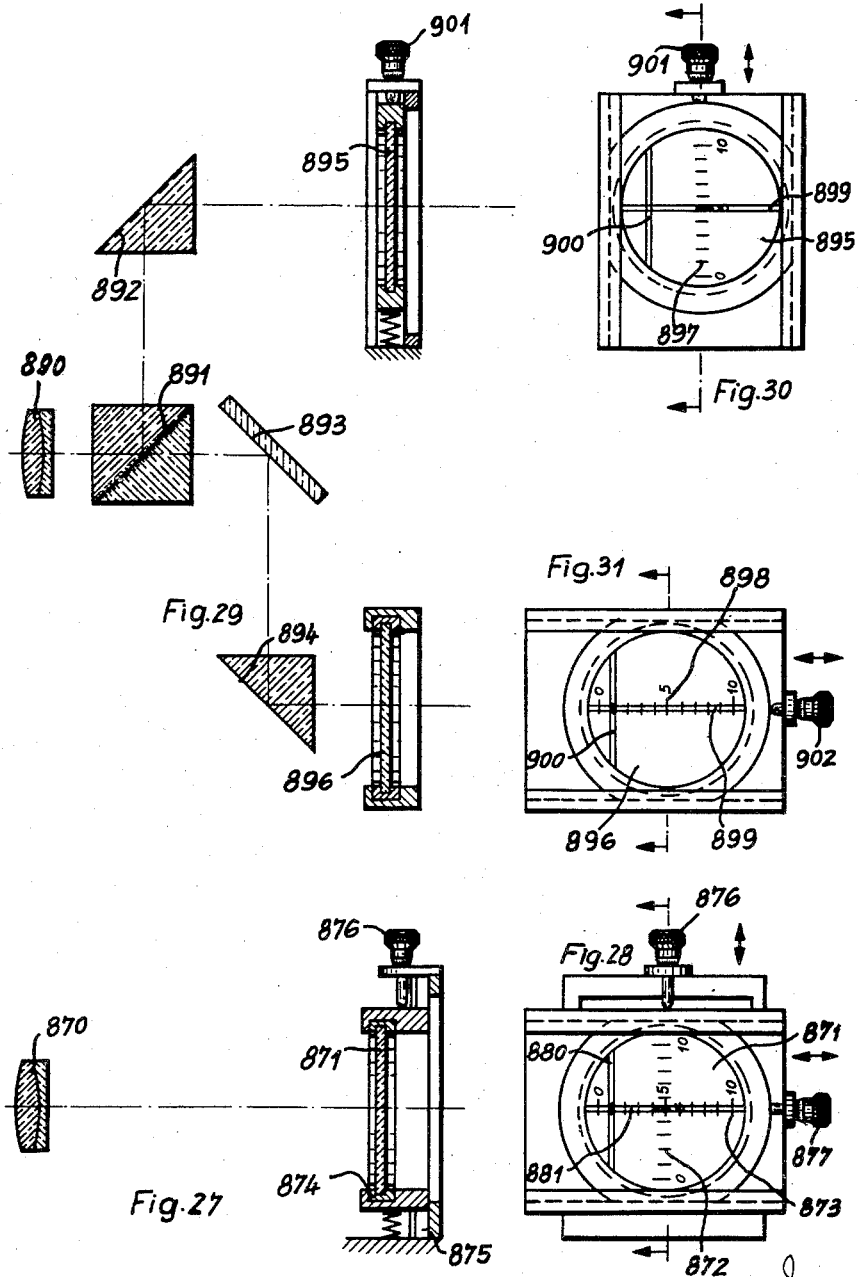

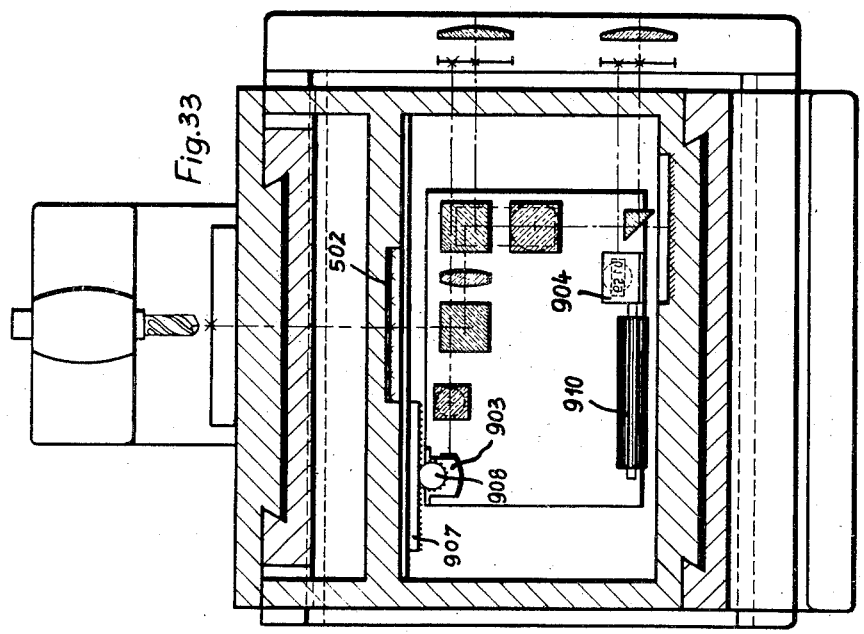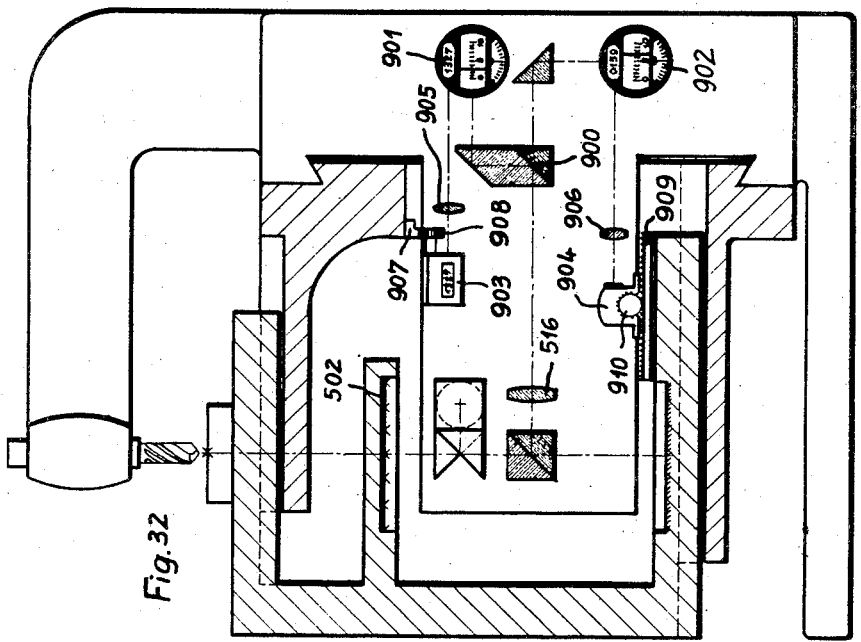

United States Patent Office 3,041,922
Patented July 3, 1962

3,041,922
OPTICAL DEVICE FOR A CORRECT ADJUSTMENT AND READING OF THE SLIDABLE DISPLACEMENT OF A CARRIAGE IN A MACHINE
Kurt Räntsch, Wetzlar, Germany, assignor to M. Hensoldt & Söhne Optische Werke A.G., Wetzlar, Germany
Filed Mar. 5, 1959, Ser. No. 797,381
Claims priority, application Germany Mar. 8, 1958
15 Claims. (Cl. 88—14)

The invention relates to an optical device for correctly adjusting and reading the amount of displacement of a slidable carriage in a machine and constitutes in particular a further development and an improvement of a similar device described and claimed in applicant's co-pending patent application Serial No. 790,917 filed on February 3, 1959. The mentioned co-pending patent application discloses an optical device for adjusting and reading the displacement of a slidable carriage in a machine in which a measuring rule is fixedly attached to a portion of the machine while a reading device is arranged in a slidable portion of the machine or vice versa, and in which optical elements project an image of a portion of the measuring rule onto the reticle of the reading device. Furthermore, the projection path is conducted over optical elements which retain their position in space even though the carriage may perform minor tilting movements as a result of errors in the guideways, in fact, these optical elements compensate any tilting movement of the carriage by a suitable deflection of the light rays in said projection path. The disclosure made in the co-pending patent application explains that the mentioned optical elements may be used in all cases in which it is desired to compensate errors in guideways for a carriage, particularly on linear measurement machines, machine tools, and the like.

It is an object of the invention to provide an optical device for the purpose as stated which is not only adapted to compensate inaccuracies in guideways extending in a single direction, but also in two different perpendicularly arranged directions, in other words, in which inaccuracies are compensated which may occur in a plane to be measured.

In a machine in which a workpiece is to be measured or is to be worked upon in a plane, it is required that three conditions have to be met in order to obtain measuring results which are free of any errors. First of all, it is required that the carriage which carries the workpiece, must be slidably displaceable in one direction and must not deviate laterally or in elevation; furthermore, a slidable displacement free from errors must also be possible in a second direction which is at right angle to the first mentioned direction and finally, the two mentioned different slidable directions of movements must always be exactly at a right angle with respect to each other.

The first condition and also the second condition may be complied with when one employs for each slidable direction of movement, as mentioned in a measuring microscope, the means disclosed in applicant's co-pending patent application. When this is done, however, the third condition is not met. Particularly, when the guide means in one direction is adjusted with respect to the other in elevation as it is the case in machine tools, measuring machines, and the like. The required rectangular position of the two slidable directions is not maintained in accordance with the present invention. However, the required rectangularity of the two slidable adjustments is obtained when the measuring table or the carriage is constructed for instance in the form of a crosswise movable table.

It is another object of the invention to employ a crosswise movable table in cooperation with a measuring grid and with optical means which project an image of a portion of this measuring grid onto the reticle of the reading device.

In accordance with still another object of the invention the reading device is constructed in a manner that it can perform readings of measurements which take place in two directions which are in right angles to one another.

With these and other objects in view as will appear hereinafter, the invention will now be described with reference to the accompanying drawings which illustrate various embodiments of an optical device in accordance with the present invention.

FIG. 6 illustrates another embodiment of the machine as shown in FIG. 1.

FIG. 7 illustrates a sectional view along the line VII—VII of FIG. 6.

FIG. 10 shows a modified embodiment of the machine as shown in FIG. 1, but provides for an adjustment of the distance between the measuring grid and the measuring plane.

FIG. 11 illustrates a device for comparing two spaced surfaces with each other and which employs a pendulum mounted prism.

FIG. 12 is a side elevation view of FIG. 11.

FIG. 13 shows a modified embodiment of the device as illustrated in FIG. 11.

FIG. 14 is a side elevation view of FIG. 13.

FIG. 15 illustrates a modified embodiment of the invention as shown in FIG. 11.

FIG. 16 is a side elevation view of the distance shown in FIG. 15.

FIG. 17 illustrates still another modified embodiment of the device shown in FIG. 11.

FIG. 18 shows a side elevation view of FIG. 17.

FIG. 27 illustrates the details of a reading device and the means for slidably displacing the reticle of the same in two different directions.

FIG. 28 shows the reticle of FIG. 27 in plane view.

FIG. 29 illustrates a different reading device employing optical means for directing the measuring rays to two different reticles.

FIG. 30 is a plane view of one of the adjustable reticle devices shown in FIG. 29.

FIG. 31 shows a plane view of the other reticle device shown in FIG. 29.

FIG. 32 illustrates a reading device in side elevation view arranged on a machine similar to FIG. 1.

FIG. 33 shows an end elevation view of the device shown in FIG. 32.

Figures 1, 2:
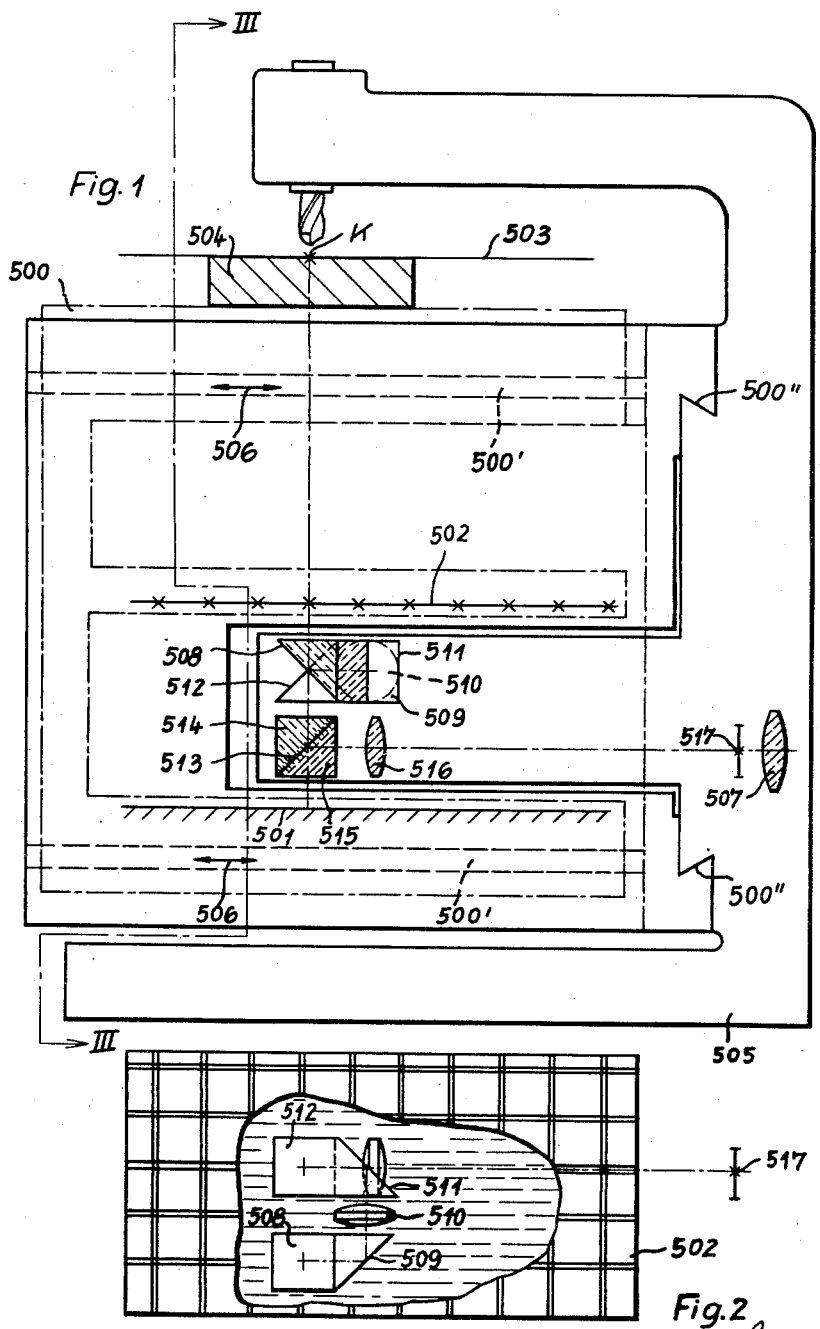
FIG. 1 illustrates a side elevation view of a drilling machine in which the workpiece is mounted on a slidable and crosswise movable carriage.
FIG. 2 illustrates a top plane view of the measuring grid employed in the drilling machine of FIG. 1 and also illustrates the optical elements for projecting an image of a portion of this measuring grid into the viewing device.

Referring to the FIGS. 1 and 2, the frame 505 of the drilling machine is provided with a horizontally slidable coordinate table 500 and a mirror surface 501. The table 500 has provided thereon a measuring grid 502 and on the measuring or operating plane 503 of the drilling machine is arranged a workpiece 504, the dimensions of which are to be determined or which workpiece is to be machined. The measuring grid 502 preferably consists of a graph having measuring lines crossing each other at right angles and spaced one centimeter apart. Each measuring line consists of two closely spaced parallel lines or a so-called double line as shown in FIG. 2. The workpiece 504 is positioned upon the table 500. The table 500 is horizontally slidable in a guideway 500' in the direction of the double arrow 506. The guideway 500' in turn is slidable in another horizontal guideway 500'' arranged at right angles to the plane of the drawing. The frame 505 of the drilling machine is equipped with optical elements which project an image of the grid scale on the table 500 onto a graduated plate or reticle 517. The light rays coming from the measuring grid 502 are first directed onto the mirror fraces 508 and 509 of the Porro system second class. From the latter the light rays pass through an objective lens 510 which projects the light rays in parallel arrangement onto the reflecting mirror faces 511 and 512 of the Porro system. The light rays then pass through a partly transparent reflecting face 513 cemented between the prisms 514 and 515 and then reach the mirror 501. After reflection by this mirror 501 the light rays are conducted by the partly transparent mirror layer 513 to a second objective lens 516 which collects the light rays on the reticle 517 of the reading device. The reticle 517 is observed by means of a magnifying lens 507.

For determining the dimensions of the work piece 504 or for machining the work piece 504 the latter is being slidably moved by moving the table 500, for instance such a distance until the desired dimension required for the machining has been correctly adjusted. During the movement of the table 500 the measuring grid 502 on the same is also moved and likewise the mirror 501 is moved. Since, however, the other optical elements do not participate in this movement, there will appear a corresponding point of the measuring grid on the reticle 517. Therefore, it is possible to determine by viewing the reticle the value of the displacement in both directions of movement of the table 500. Any guide errors in the guideways of the crosswise movable table 500 are compensated by the mirror surface 501.

Figure 3:
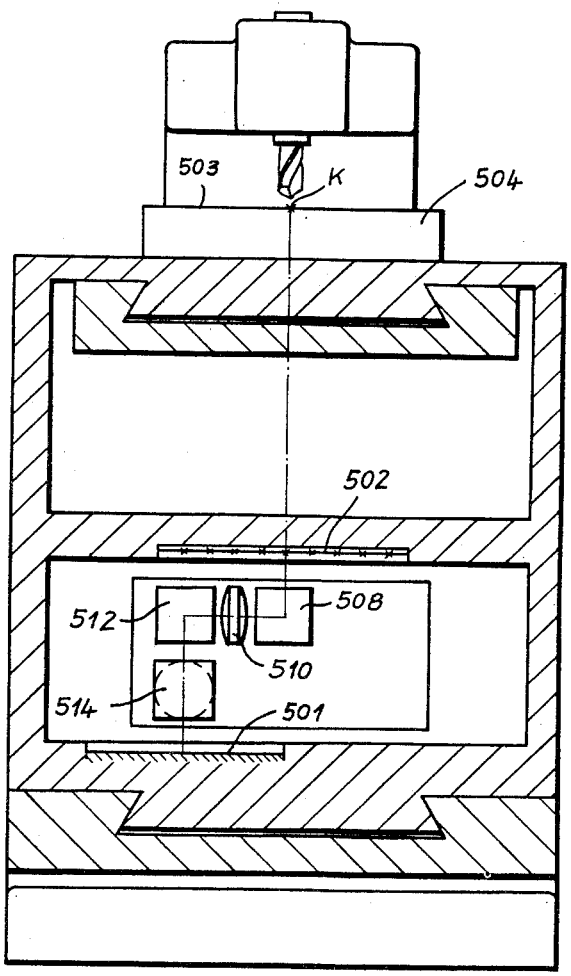
FIG. 3 is a section along the line III—III of FIG. 1.
Figure 3A:
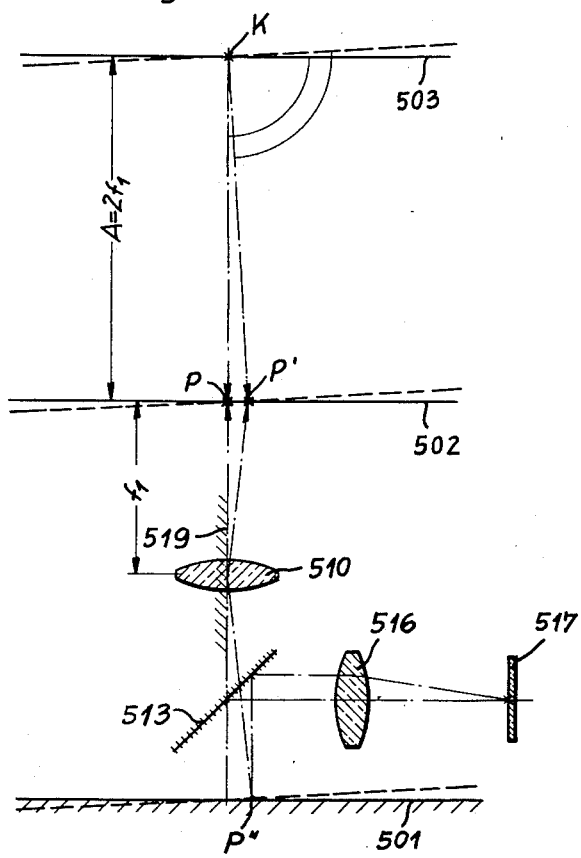
FIGS. 3a and 3b illustrate the operation of the optical compensation device employed in FIGS. 1 and 2.
Figure 3B:
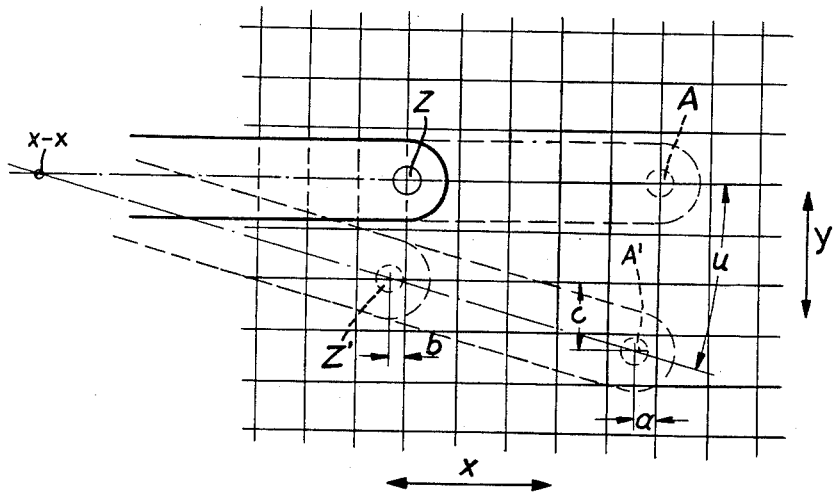

The effect of this compensation is diagrammatically illustrated in FIGS. 3a and 3b. The guide errors to be compensated may be divided into two types of errors. One error may occur when the slidable table should tilt about an axis extending parallel to the guide plane while on the other hand another error may occur when the slidable table tilts about an axis which extends at right angles to the guide plane. The first error, when it occurs, is illustrated in FIG. 3a while FIG. 3b illustrates the second error.

According to the error illustrated in FIG. 3a, the workpiece 504 together with the grid scale 502 and the mirror 501, for instance, tilts about an axis which extends parallel to the guide plane and through the cross point K of the projecting system. The measuring point P will then appear at P'. The Porro system second class 508, 509, 511, 512 constitutes in effect a reflecting optical axis. This axis has been designated in FIG. 3a with 519. The light rays coming from the point P' are reflected onto this axis or respectively in this Porro system second class in such a manner that the light rays reach the mirror in the point P''. From here the light rays are reflected and are directed by the partly transparent mirror layer 513 to the optical axis of the objective lens 516. Accordingly, the objective lens 516 collectes the light rays again on the same point in the reading window 517.

FIG. 3a also illustrates that the distance of the objective lens 510 from the grid scale 502 is equal to $f_1$ and this distance is equal to the focal length of this objective lens 510 and the distance of the grid scale 502 from the measuring plane 503 is equal to $2f_1$ so that the cross point K of the projection system will fall into the measuring plane.

A corresponding compensation would be obtained when the axis of tilt extends again parallel to the guide plane but parallel to the plane of the drawing.

FIG. 3b illustrates the condition in which the reading point A in the grid scale and also the target point or the point of machining Z on the work piece should tilt about an axis at right angles to the guide plane about an angle U and passing through the point X—X. It is assumed furthermore that the target point Z and the reading point A are not vertically arranged one above the other. In such a case the target point Z moves to Z' and the reading point A moves to A'. The points Z and Z' differ in the direction of the arrow X a distance equal to $b$ and the points A and A' differ about a distance equal to $a$. One will recognize that the distance $b$ is greater. In addition, the points Z' and A' differ in the direction of the arrow Y about a distance equal to $c$. The points A and Z, when no errors are made, have to be moved, however, always about the same distance. This is possible only when, as it is assumed according to the invention, the points Z and A are arranged one above the other.

Figure 4:
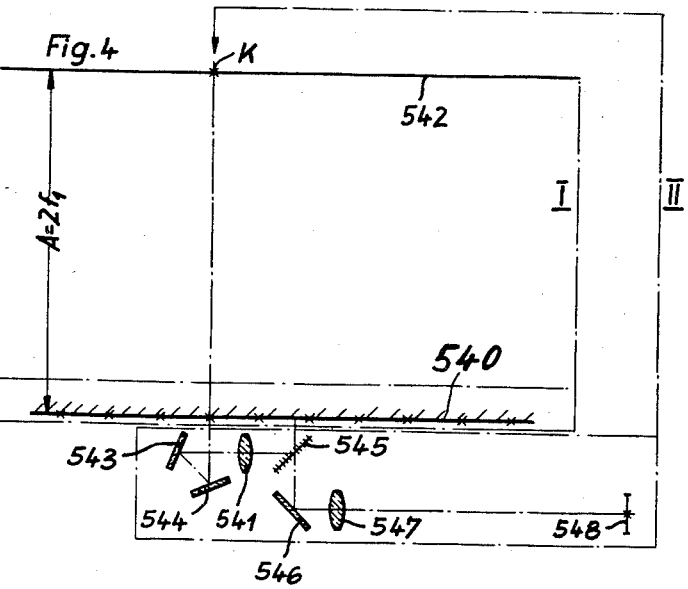
FIG. 4 illustrates a modified embodiment of the machine illustrated in FIG. 1.
Figure 5:
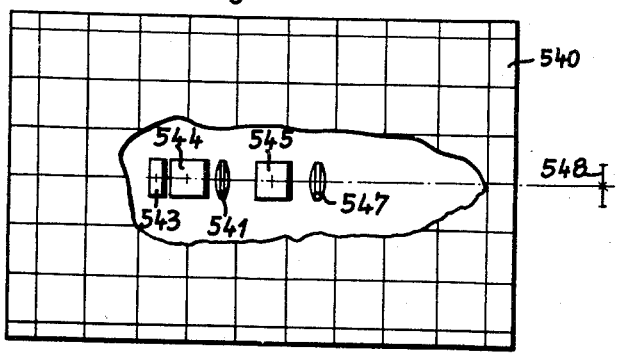
FIG. 5 is a top plane view of the measuring grid of the machine shown in FIG. 4 and also shows some of the optical elements for projecting the measuring result into the viewing device.

The FIGS. 4 and 5 illustrate an embodiment of the invention in which the grid scale is arranged on a mirror surface 540 which retains its position. The grid scale on the reflecting mirror surface 540 is again arranged at a distance equal to the focal length $f_1$ of the projecting system 541 away from the latter. The distance between the grid scale on the surface 540 and the measuring plane 542 is again equal to $2f_1$.

The light rays coming from the grid scale are reflected by a reflecting square having the reflecting faces 543 and 544 into an objective lens 541. In rear of this objective lens 541 the light rays meet the partly transparent mirror layer 545 which reflects the light rays at a right angle onto the mirror 540. After being reflected by this mirror 540 the light rays pass through the semi-transparent mirror layer 545 and after reflection by another mirror 546 the light rays enter an objective lens 547 which again collects the light rays on the reticle 548 of the reading device.

In the above described embodiments of the invention the grid scale is arranged between a mirror which retains its position and the measuring plane.

The FIGS. 6 and 7 illustrate an embodiment of the invention in which a mirror surface 560 which retains its position is arranged between the measuring plane 561 and the grid scale 562. The distance between the measuring plane 561 and the grid scale 562 is again equal to $2f_1$, when $f_1$ is equal to the focal length of the objective lens 563. The grid scale 562 itself is arranged again at a distance equal to the focal length $f_1$ away from the objective lens 563.

In this last described embodiment of the invention the light rays coming from the grid scale 562 are conducted by means of plane mirrors 564 and 565 into the objective lens 563. After deflection on the further mirror 566 the light rays are again conducted to the semi-transparent mirror 567 which directs the light rays after reflection by the mirror 566 and the partly transparent mirror surface 567 and the reflecting rear face of the mirror 564 into the objective lens 568.

Figure 8:
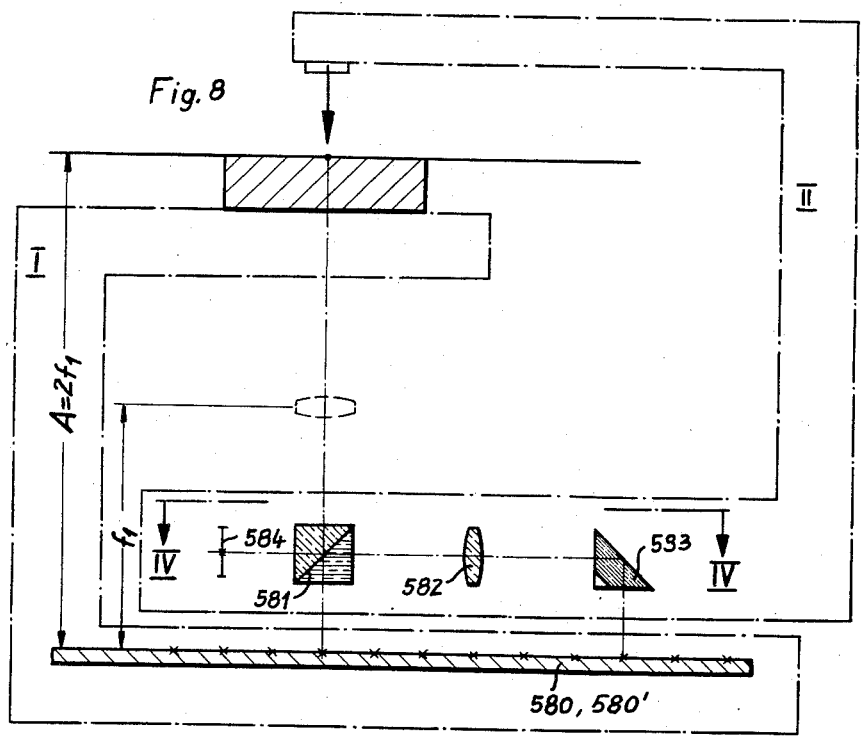
FIG. 8 illustrates still another modified embodiment of a machine according to FIG. 1, but illustrates only a single objective lens.
Figure 9:
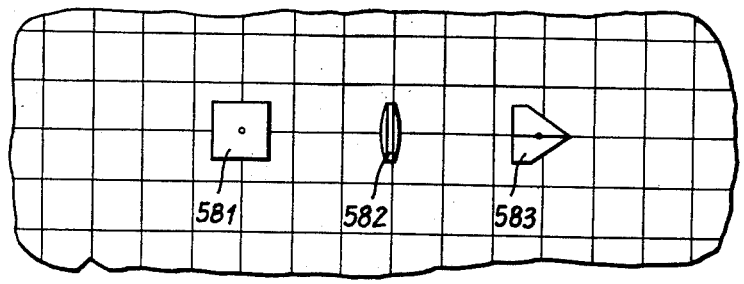
FIG. 9 is a sectional view along the line IX—IX of FIG. 8.

The FIGS. 8 and 9 show an embodiment corresponding to the arrangement of the FIGS. 6 and 7, except that here again the grid scale is arranged in the plane or on the mirror 580 which retains its position. The light rays coming from the grid scale 580' are reflected by a semi-transparent mirror layer 581 into the objective lens 582 which directs the light rays into a roof edge prism 583 which in turn reflects the light rays onto the mirror 580. After reflection on this mirror 580 the light rays are again conducted by means of the roof edge prism 583 into the objective lens 582 and through the semi-transparent mirror layer 581 onto the reticle 584 of the reading device. In this modification the second objective lens is omitted.

FIG. 10 illustrates an arrangement which corresponds to that of the one shown in FIGS. 1 and 2, except that the Porro system second class has been replaced by a Pechan prism 600. This last prism effects a complete reversal of the image. The light rays coming from the grid scale 602 are directed by the Pechan prism 600 and a partly transparent mirror 601 into the objective lens 603. The light rays passing through this objective lens 603 will be parallel and pass through a Galilei system 604. From the latter the light rays reach a mirror 605 which retains its position and are reflected by the latter back into the Galilei system and objective lens 603 and then are reflected by the semi-transparent mirror surface 601 onto the reticle 606 of the reading device.

The Galilei system 604 can be replaced selectively by additional Galilei systems 604', 604" etc. All of the just mentioned Galilei systems 604, 604', 604" etc. are mounted in a drum 607 which is rotatably mounted by means of a shaft 608 about an axis arranged at right angles to the mirror surface 605. Depending upon the enlargement produced by the Galilei system 604 which is arranged in the path of the light rays, the distance of the operating plane 609 from the grid scale 602 is changed. If the Galilei system selected produces an enlargement 1:2, then the operating plane will be arranged in the position indicated with 609. If, however, the Galilei system 604 is selected, which produces an enlargement 1:1.4, then the operating plane will be shifted into the position indicated with 609$^1$. When the Galilei system is employed producing an enlargement 1:1 or, what is the same, if no Galilei system is employed at all, then the operating plane will be positioned in the location designated with 609$^2$ in FIG. 10. When the Galilei system producing an enlargement 1:0.7 is employed, then the operating plane is located at 609$^3$ and finally, when a Galilei system producing an enlargement 1:0.5 is employed, then the operating plane is arranged at 609$^4$.

The FIGS. 11 and 12 disclose an embodiment of the invention in which the structures of two surfaces 610 and 611 are compared with each other. For this purpose the FIGS. 11 and 12 disclose two objective lenses 612 and 613 which are arranged between the two surfaces 610 and 611. Each objective lens is associated with two mirrors 614, 615 and 616, 617 respectively. The surfaces 610 and 611 are arranged at a distance equal to the focal length of the objective lenses 612 and 613 away from the latter. Between the objectives the light rays are parallel. The point of intersection of the two objective lenses is located at K. Between the objective lenses 612 and 613 is arranged a direct-vision reversing prism 618.

This prism 618 is swingably mounted about an axis D—D. The axis D—D is arranged parallel to the surfaces 610 and 611. This arrangement effects a compensation of errors in the guideways by means of slidably moving optical elements between the surfaces 610 and 611 in a direction which extends at right angles to the pivot axis D—D.

If it is desired to obtain a compensation in an axis of displacement which is at right angles to the plane of the drawing, then the prism 618 is preferably replaced by a prism 620 as shown in the FIGS. 13 and 14. The last mentioned prism has an additional roof edge 621 and is mounted in a Cardan joint 622 so that it may adjust itself in all directions under the action of gravity.

The FIGS. 15 and 16 illustrate the projection of structures of two surfaces 650 and 651 by means of two telephoto objectives 652 and 653, arranged in axial alignment. Between these telephoto objectives the light rays are again parallel and in these parallel light rays is arranged a prism 654 corresponding to the prism 618 in FIG. 11. The prism 654 is tiltably mounted about an axis E—E extending parallel to the surfaces 650 and 651. If one will obtain a compensation in two directions, then it is required that the prism 654 be replaced by a prism 670 having a roof edge 671 as shown in the FIGS. 17 and 18. Furthermore, the prism 670 should be suspended in a Cardanic mounting. In this case it is, however, also possible to mount the telephoto objectives 652 and 653 also in the Cardanic mounting so that the entire projection system is rotatable under the action of gravity.

Figure 19:
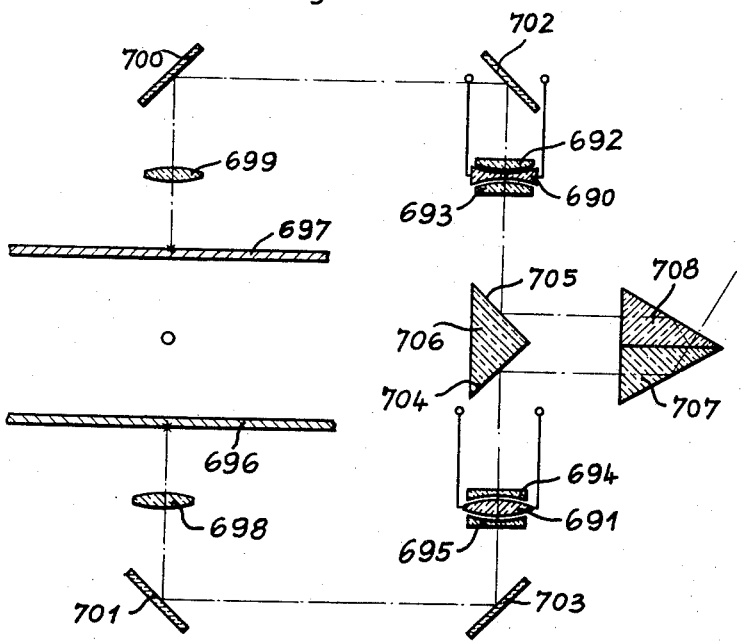
FIG. 19 illustrates still another modified embodiment of the device shown in FIG. 11.

In the just described embodiment of the invention the structures of the surfaces to be examined are arranged in such a manner that they face each other. Of course, it is also possible to obtain an equivalent compensation when the structures of the surfaces to be examined are arranged to face away from each other. Such an arrangement is illustrated in FIG. 19 in which the means for compensation consist of pivotally mounted lenses 690 and 691. These pivotally mounted lenses cooperate with lenses 692, 693 and 694, 695 in such a manner that in the zero position of the lenses 690 and 691 the entire lens assembly forms a plane parallel plate. As soon as the lenses 690 and 691 are tilted, however, the mentioned lens assembly forms an optical wedge.

In the preceding examples of the invention the conditions or the structures of the surfaces are directly projected one upon the other. For this reason it is required that at least one of the two surfaces be transparent so that one is able to observe the superimposed images of the structures. In the example of the invention illustrated in FIG. 19, the images of the surfaces 696 and 697 are projected by means of the objective lenses 698 and 699 and the reflecting mirrors 700, 701, 702, and 703 and the pivotally mounted lenses onto the reflecting faces 704 and 705 of a prism 706. The faces 704 and 705 of this prism reflect the light rays into a prism 707, having a partly transmittent mirror layer 708. At this point, the light rays are superimposed and the images of the structures of the two surfaces 696 and 697 can be observed at the same time, for instance by means of a magnifying lens or the like.

Figure 20:
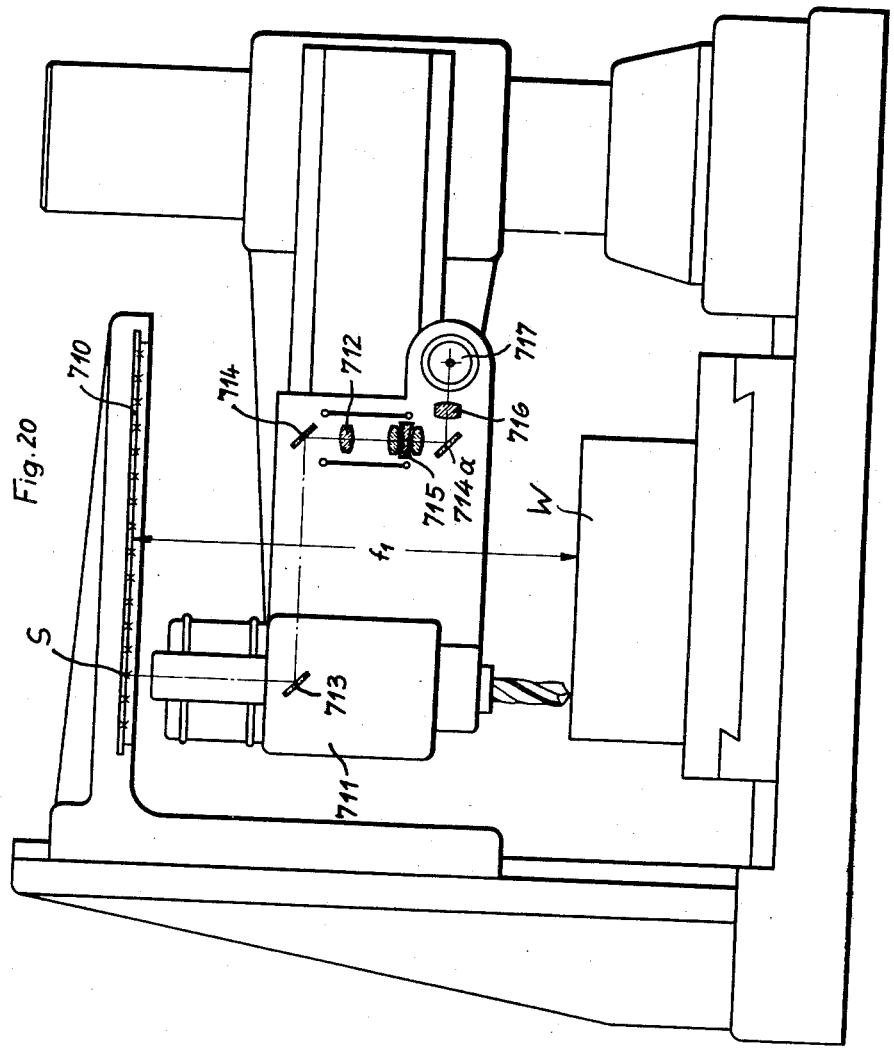
FIGS. 20, 21 and 22 show each a device for drilling workpieces with the assistance of a template and show different compensation devices.
Figure 21:
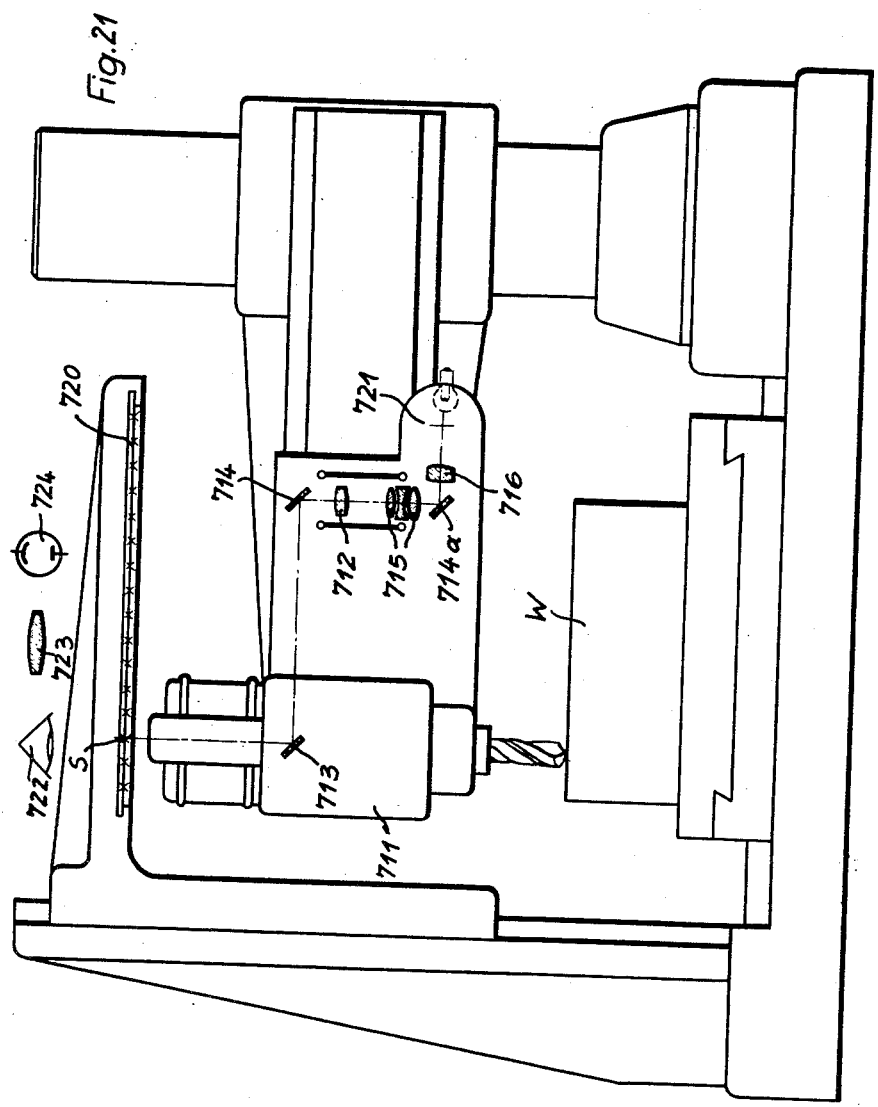
Figure 22:
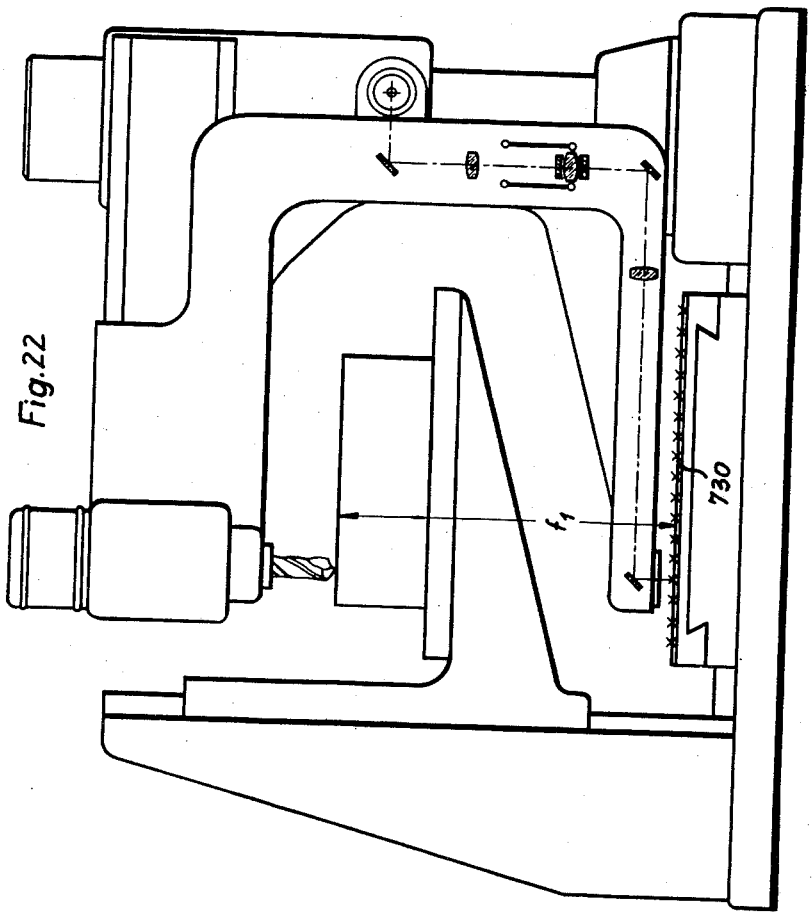

The FIGS. 20, 21 and 22 illustrate devices for drilling of workpieces by employing a template. Such machines may laso be used for multiplication of templates.

FIG. 20 shows by way of example that the template 710 is scanned optically. For this purpose, a point S of the template is reflected by mirrors 713, 714 into an objective lens 712 and the latter directs the light rays into a swingably mounted lens compensator 715 and over a mirror 714a and an additional lens 716 into the reading window 717 of the reading device. The mentioned projecting elements are movable with the workpiece carrier. The reading window 717 is provided with a reticle which is employed to observe the point S of the template. The template is arranged at a distance equal to the focal length $f_1$ of the objective lens 712 away from the latter. The same distance is arranged between the template 710 and the point of the drill.

FIG. 21 shows a modification of the device illustrated in FIG. 20 and illustrates the conditions when the template 720 is transparent. In this case, the reticle 721 is projected by the optical means shown in FIG. 20 onto the template 720 to the point S. The correct position of the image of the reticle on the template 720 can be observed and controlled with the human eye 722. One may, however, also employ for this purpose a magnifying lens 723 or a microscope or also a photoelectric cell 724 as diagrammatically indicated in FIG. 21.

In the FIGS. 20 and 21 the tool carrier extends into the space between the template 720 and the workpiece W.

FIG. 22, however, illustrates the condition in which the template 730 is arranged below the tool carrier which is mounted on a U-shaped frame. The operation of this last mentioned device is, however, the same.

Figure 23:
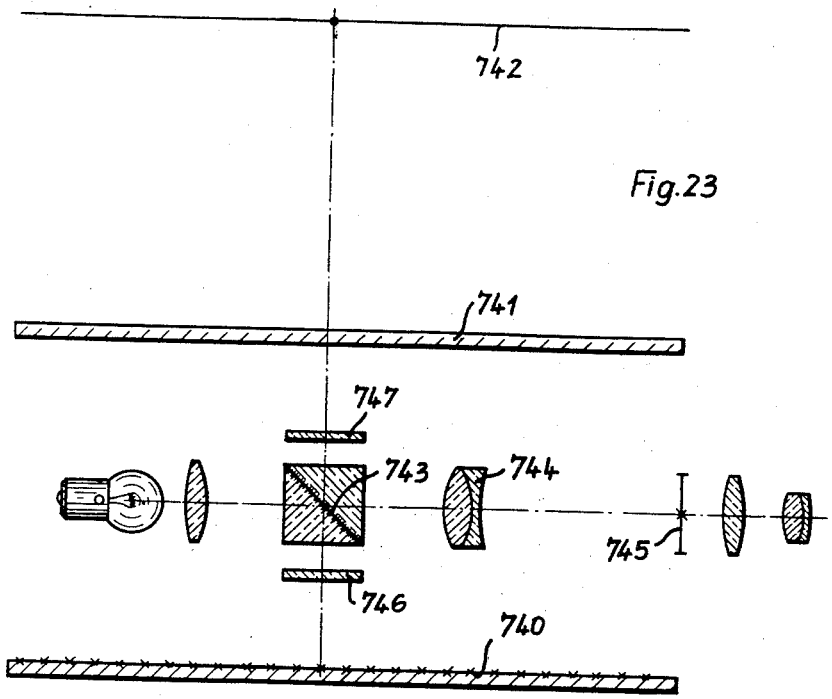
FIG. 23 shows a device according to FIG. 1 but with a virtual superimposition of the measuring plane and the measuring grid plane.
Figure 24:
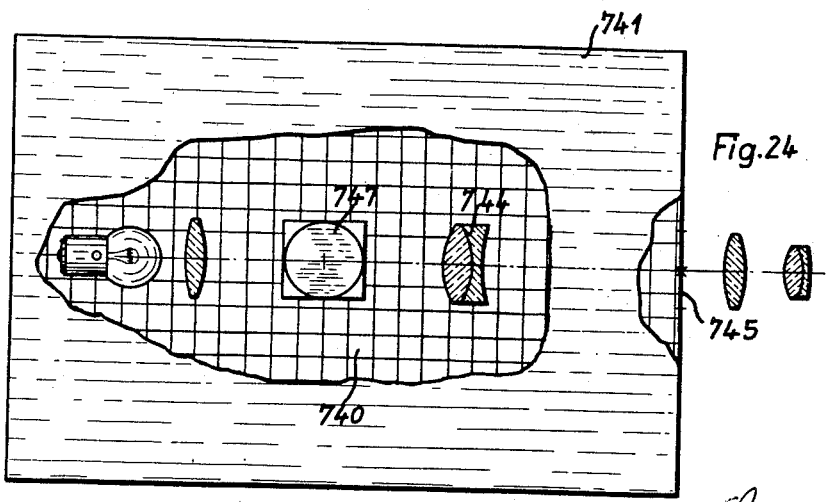
FIG. 24 is a top plane view of the device shown in FIG. 23 with parts broken away to illustrate the optical means and the measuring grid.

The FIGS. 23 and 24 illustrate another embodiment of the invention which relates to a measuring device employing a measuring grid. The measuring grid 740 is being virtually superimposed upon the mirror 741 which retains its position, and also upon the measuring plane 742.

The light rays coming from the measuring grid 740 pass through a partly transmitting mirror layer 743 and are directed upon the mirror 741 which reflects the light rays back onto the mirror layer 743 which latter directs the light rays into the objective lens 744. In this device there are employed λ/4 plates 746 and 747 for improving the brightness since the light dividing cube polarizes a portion of the light. The objective lens 744 collects the light rays on the reticle 745 of the reading device.

Figure 25:
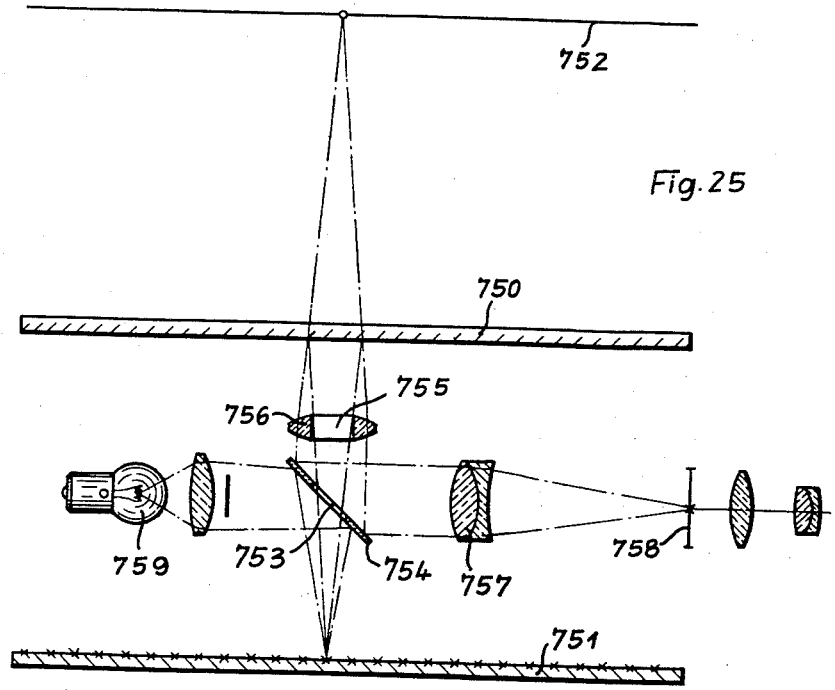
FIG. 25 illustrates a modified embodiment of the device as shown in FIG. 23.
Figure 26:
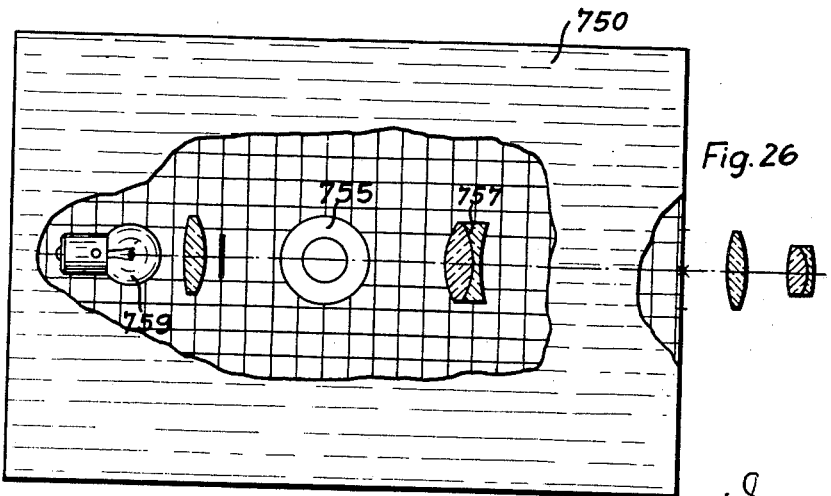
FIG. 26 is a top plane view of the device of FIG. 25 with parts broken away to show the optical means and the measuring grid.

The FIGS. 25 and 26 show a device corresponding to the device shown in FIGS. 23 and 24. The mirror 750 projects the measuring grid 751 virtually in the measuring plane 752. The light rays coming from the measuring grid 751 pass first of all through a bore 753 in the mirror 754 and then pass through a bore 755 in a lens 756. The light rays are then reflected by the mirror 750 and are changed to a parallel light beam by the lens 756. The light beam is reflected by the mirror 754 into a second objective lens 757 which projects the light rays onto the reticle 758 of the reading device. The plane plate 754 is provided on both faces with a reflective layer. The rear face of this mirror 754 is used for the purpose of reflecting light which comes from a source of light 759 onto the measuring grid 751.

The FIGS. 27 and 28 explain in more detail the operation of the reading device employed in the embodiment of one of the preceding figures. The light rays coming from the measuring grid 880, 881 are projected by the objective lens 870 onto the reticle 871. As shown in FIG. 28 the reticle 871 is provided with two reading scales 872 and 873. The reading scales 872 and 873 are arranged at a right angle with respect to one another and subdivide the space between each two measuring lines of the measuring grid 880 and 881 in ten parts.

The reticle 871 is mounted in a crosswise movable carriage 874, 875 in the directions of the reading scales 872 and 873. The slidable displacement of the carriage 874, 875 is effected by the measuring screws 876 and 877 which also indicate the degree of displacement which has taken place. For the purpose of adjusting or reading the measuring value, the reticle 871 is slidably adjusted by the measuring screws until one double line 880 forming a measuring line of the measuring grid encloses between its two closely spaced lines one scale line of the reading scale 873 and until a double line 881 of the measuring grid encloses in similar manner one single scale line of the measuring scale 872. The measuring screws then indicate on the circumference on suitable scales the fractions of the degrees on the reading scales 872 and 873 respectively.

Referring now to the FIGS. 29 and 31, it will be noted that the light rays passing through the objective lens 890 are divided by a partly transmitting mirror layer 891 and are directed by mirrorfaces 892 on one hand and mirror faces 893 and 894 on the other hand onto reticles 895 and 896 respectively. Each one of the reticles 895 and 896 is provided with a reading scale 897 and 898 respectively. The reading scales 897 and 898 are arranged perpendicular with respect to one another so that the reading scale 897 subdivides the spaces of the measuring grid between the scale lines 899, while the reading scale 898 subdivides the space between the scale lines 900 of the measuring grid. The reticles 895 and 896 are provided with micrometers 901 and 902 which are adapted to move the reticles in the direction of the measuring scales arranged on these reticles. Also in this case the reticles 895 and 896 are slidably moved until the double lines forming a measuring line of the measuring grid enclose between them one scale line of the associated measuring scale. The measuring screws then indicate the corresponding value of displacement as a measuring value.

The FIGS. 32 and 33 show a reading device which also is employed in connection with the machine illustrated in FIG. 1. The light rays coming from the objective lens 516 are directed through a partly transmitting mirror 900 into the picture windows 901, 902. The lines of the measuring grid 502 are not provided with any numbers. For indicating the numbers, there is provided for each direction of the measuring lines a counting mechanism. The same are indicated in FIG. 32 with 903 and 904. The numbers of the counting mechanism 903 are projected by a lens 905 into the window 901 and the numbers of the counting mechanism 904 are projected by a lens 906 into the window 902. The counting mechanism 903 is driven by a rack bar 907 which engages a gear 908 of the counting mechanism 903. The counting mechanism 904, however, is operated by a rack bar 909 which forms an angle of 90° with respect to the rack bar 907 and engages a gear 910 of the counting mechanism 904.

When in FIG. 32 the workpiece carriage or the table is moved parallel to the plane of the drawing, then the lines of the measuring grid travel in the window 902 and, accordingly, the values of the lines in the window change during this displacement. In FIG. 32 the window 902 indicates a value of 0159. When the workpiece carriage or table is moved perpendicularly to the plane of the drawing, then the lines of the measuring grid travel in the window 901. In accordance therewith, the values indicated by the workpiece 903 will change and, for instance, there appears in the window 901 the value 1327.

What I claim is:

1. In an optical device for accurately adjusting and reading the amount of displacement of a rectilinearly slidable workpiece table in a machine, such as a machine tool, linear measuring device and the like having a surface defining a measuring plane, a frame, a horizontally slidable table, a horizontal guide way for said table, another horizontal guide way for said first mentioned guide way and extending at right angles to the latter and arranged on said frame for rectilinear movement, a horizontally disposed measuring grid arranged in a plane parallel with said table and spaced therefrom a predetermined distance, a reading device mounted on said frame and having a reticle, optical means mounted on said frame for projecting a portion of said measuring grid onto said reticle of the reading device, said optical means including self-compensating prismatic and reflecting optical elements which retain their position when owing to inaccuracies in said guideways said slidable table is tilted in one or both directions of said guideways and compensate the deflection of the measuring rays in both rectilinear directions, said prismatic and reflecting optical elements causing the projection by reflection of a portion of the measuring plane and a portion of said measuring grid in superimposition onto said reticle, said portions of the measuring plane and measuring grid respectively being arranged a predetermined distance in vertically spaced relation one above the other in said frame, and said grid being arranged a predetermined spaced distance from said optical means.

2. Optical device according to claim 1, in which said measuring grid consists of uniformly spaced double lines crossing each other at right angles.

3. Optical device according to claim 1, in which each measuring line of said measuring grid consists of two closely spaced parallel lines, said measuring lines are spaced from one another one centimeter and one series of measuring lines crosses another series at right angles.

4. Optical device according to claim 1, in which one of said prismatic and reflecting optical elements which retain their position consists of a plane mirror having a size substantially the same as that of the measuring grid.

5. Optical device according to claim 1, in which one of said prismatic and reflecting optical elements which retain their position consists of a plane mirror extending parallel to the guideway of said table.

6. Optical device according to claim 1, including in said prismatic and reflecting optical means a first objective lens in the focal plane of which said measuring grid is positioned, and a second objective lens which projects the light rays coming from said first objective lens onto the reticle of said reading device, and a mirror surface which retains its position arranged between said first and second objective lens, the distance between the measuring plane and the plane of the measuring grid being equal to $2f_1$, when $f_1$ is equal to the focal length of said first objective lens.

7. Optical device according to claim 6, in which said prismatic and reflecting optical means including two mirror surfaces of a Porro-system second class are each arranged in front and in rear of said first objective lens and that a partly transmitting mirror surface reflects the light rays leaving said Porro-system on one hand onto said mirror surface which retains its position and on the other hand directs the light rays reflected by said last mentioned mirror surface into said second objective lens.

8. Optical device according to claim 4, in which the measuring grid is mounted on the plane mirror which retains this position.

9. Optical device according to claim 1, in which one of said optical elements which retain their position consists of a plane mirror having a size substantially the same as that of the measuring grid, and including in said optical means a first objective lens, in the focal plane of which said measuring grid is positioned, a second objective lens which projects the light rays coming from said first objective lens onto the reticle of said reading device, a reflecting square positioned in front of said first objective, and a partly transmitting mirror arranged in rear of said objective for reflecting the light rays onto said plane mirror which retains its position, said partly transmitting mirror being also effective to reflect the light rays coming from said plane mirror to said second objective.

10. Optical device according to claim 6, in which said optical means is disposed between the measuring grid and the mirror surface which retains its position, said optical means being also disposed between said measuring grid and the measuring plane, and including a plurality of plane mirrors disposed in front of said first objective lens.

11. Optical device according to claim 6, including a partly transmitting reflecting surface in front of said first objective lens, a mirror arranged in rear of said first objective lens, said mirror reflecting the light rays perpendicularly upon said mirror surface which retains its position, said mirror in rear of said first objective lens directing the light rays through said first objective lens and by means of said partly transparent reflecting surface onto the reticle of said reading device.

12. Optical device according to claim 11, in which said mirror in rear of said first objective lens consists of a reflecting square which forms together with said partly transmitting mirror a triple mirror system.

13. Optical device according to claim 6, including a plurality of Galilei-type telescopes, each of which is selectively insertable into the path of the light rays between said first objective lens and said mirror surface which retains its position.

14. Optical device according to claim 6, including a plurality of Galilei-type telescopes, each of which is selectively insertable in the path of the light rays between said first objective lens and said mirror surface which retains its position, and a rotatable member on which said plurality of Galilei-type telescopes is mounted.

15. Optical device according to claim 13, including a Pechan prism disposed between said measuring grid and said partly transmitting mirror.

References Cited in the file of this patent

UNITED STATES PATENTS

| | | |
|---|---|---|
| 2,368,434 | Turrettini | Jan. 30, 1945 |
| 2,422,611 | Becher et al. | June 17, 1947 |
| 2,581,823 | Turrettini | Jan. 8, 1952 |
| 2,809,540 | Schultze | Oct. 15, 1957 |
| 2,879,692 | Turner | Mar. 31, 1959 |
| 2,933,013 | Baker et al. | Apr. 19, 1960 |

FOREIGN PATENTS

| | | |
|---|---|---|
| 561,783 | Great Britain | June 5, 1944 |